July 12, 1927.
H. V. LOUGH ET AL
1,635,187
APPARATUS FOR COVERING ANNULAR RINGS
Filed May 25, 1923
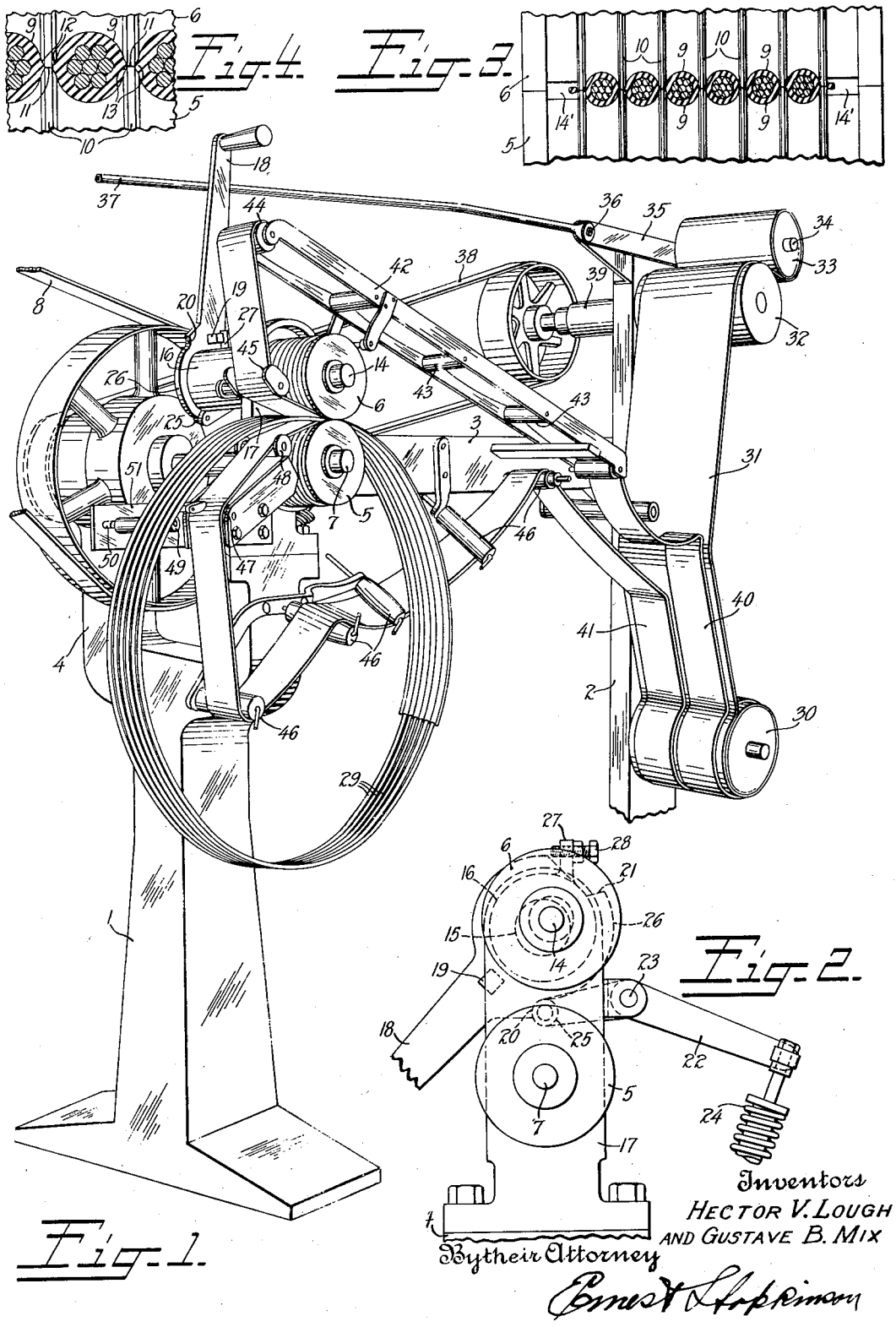
Inventors
HECTOR V. LOUGH
AND GUSTAVE B. MIX
By their Attorney Patented July 12, 1927.

1,635,187

UNITED STATES PATENT OFFICE.

HECTOR V. LOUGH, OF HARTFORD, CONNECTICUT, AND GUSTAVE B. MIX, OF DETROIT, MICHIGAN, ASSIGNORS TO MORGAN & WRIGHT, OF DETROIT, MICHIGAN, A CORPORATION OF MICHIGAN.

APPARATUS FOR COVERING ANNULAR RINGS.

Application filed May 25, 1923. Serial No. 641,373.

This invention relates to a method and apparatus for applying rubber composition to wires, and more particularly, annular bead rings that are incorporated in the margins of a straight-side type of tire casing which is in large use in this country.

The invention aims to provide a simple, efficient and reliable apparatus for economically covering the annular rings with a relatively hard rubber composition in a condition suitable for incorporation in the margins of tire casings. It also aims to provide a method of manufacture in which a number of the rings are covered simultaneously and separated and partially cured to facilitate their building into tire casings. Other objects of the invention will appear hereinafter.

With the illustrated embodiment of the machine in mind and without intention to limit more than is required by the prior art, the apparatus consists essentially of a pair of oppositely grooved rolls, which are driven so as to turn the rings about their common axis while maintaining them in close concentric relation, sheets of rubber stock being progressively drawn by the rolls and pressed down around the wires and between them where the rubber is pinched. When the entire periphery of the rings is thus covered, the machine is stopped, the strips of stock cut off at the right distance, and the ends of the stock properly finished. The plurality of rings thus covered are then removed from the machine and pulled apart by the operator, preliminary to mounting them separately in sectional molds where they are semi-cured in a manipulatable condition and to a rather precise size in cross-section or, alternatively, the plurality of rings may be partially cured free without confining molds and in an open steam heat, for instance, and then separated.

An embodiment of the invention is illustrated in the accompanying drawings in which:—

Figure 1 is a perspective of the apparatus, showing a plurality of rings being covered;

Figure 2 is a fragmentary elevation of the pressing rolls, illustrating the mechanism for shifting the upper grooved roll;

Figure 3 is a cross-section through the rubber-covered wires at the bight between the grooved rolls which appear in elevation;

And Figure 4 is an enlarged detail, illustrating a feature of the construction of the ribs between the grooves and the several rolls.

The apparatus is supported on standards 1 and 2, adapted to be suitably attached to the floor of a factory, a bar 3 connecting the standard 2 with the frame or head 4, in which are suitably journalled grooved rolls 5 and 6. The lower grooved roll 5 is fast on a shaft 7, which may be rotated or driven in any suitable manner and at any suitable speed, means for driving it being conventionally illustrated at 8. It will be understood, of course, that any suitable mechanism may be employed to drive the shaft 7, either directly or through a clutch, these instrumentalities being omitted from the drawings for the sake of clearness and being old and well-known. And any suitable agency may be employed to start and stop the machine, such as a belt-shifter (not shown) governing the belt 8, or a clutch operating lever (not shown).

The rolls 5 and 6 preferably have substantially semi-circular grooves 9 machined in their periphery, these being separated by ribs 10, having relatively narrow contacting faces 11, which are flanked by conical, or otherwise fashioned, convergent faces 12, which permit a slight excess or fin of rubber forming in the V or cusp-shaped groove 13, which is defined between the grooved rolls when they are in working relation. The margins of the rolls are preferably machined away, as indicated at 14', to define an opening or gap at the bight between the rolls so that surplus stock may be accommodated and trimmed off from the outside wires.

The roll 6 is preferably located vertically above and parallel to the roll 5. And means are also preferably provided for shifting the upper roll from and to working relation with the lower roll in order to facilitate the introduction of the rings and the manipulation of the stock. But, of course, either or both of the grooved rolls might be mounted for separation or shift, if desired. While the shaft 14, on which the upper roll 6 is mounted for free rotation, may be supported in any suitable manner for shifting movement—as for instance by a sliding head (not shown)—it is preferred to employ the construction illustrated in the drawings, particularly in Figures 1 and 2, which comprises a shaft 15 sustaining the shaft 14 eccentrically. That is to say, the axes of the two shafts 14 and 15 are out of line and parallel but not coincident, the amount of the eccentricity being as desired but sufficient to space the rolls apart enough to give no trouble to the operator in inserting or removing the rings either before or after they are covered. The shaft 15 is preferably journalled in a portion 16 of the head 4, the portion 16 being connected therewith through the upright plate 17. Fast to the shaft 15, is a hand-lever 18, which is provided with or carries stops or lugs 19, 20 and 21, these latter being fashioned in or attached to the lever 18 in any desired manner. A bell-crank lever 22, fulcrumed at 23, is normally urged by a spring 24 in a clockwise direction so as to carry a roller 25 mounted on the lever 22 against an approximately circular face 26 provided on the hand-lever 18, which face terminates at one end in the aforesaid stop 20, and at the other end in the stop-shoulder 21. When the lever 18 is pulled down to the position shown in Figure 2, the roller 25 on the bell-crank lever 22 halts the elevation of the upper roll from the lower roll at a suitable point. After the work has been introduced and the strips of rubber initially applied, the operator brings the upper roll 6 down into working relation with the lower roll 5 by turning the lever 18 to the upright position shown in Figure 1, in which the stop 19 is in contact with the stationary abutment 27, preferably having a screw 28 for adjustment. In raising the lever 18 to the position shown in Figure 1, however, the shoulder 21, which moves with the lever 18, is carried slightly past the roller 25 on the lever 22, thereby allowing the spring 24 to turn the latter clockwise into a position substantially locking the lever 18 against movement, thereby holding the two grooved rolls in working relation. Thus, the operator's hands are freed for manipulation elsewhere.

While strips of rubber stock, which are preferably of a semi-hard rubber composition (similar to that used in the manufacture of solid rubber tires immediately adjacent the metallic base-bands) may be previously cut the right length and width and applied to the inside and outside of the gang of rings, it is preferable, for factory purposes, to supply the stock from an indefinite length thereof coiled up on a liner. And while also, two separate rolls of stock may be employed, one located outside and one located inside of the gang of rings, it is preferred to draw the stock from one and the same supply roll. Means for accomplishing the latter purpose are illustrated in the apparatus disclosed in the drawings, in which a supply of stock on a liner is indicated at 30, the liner 31 being conducted over a liner feed-roll 32 to a wind-up reel 33, which is supported for free rotation on a pin 34, carried by a lever 35, which is fulcrumed at 36 and has its operating extremity 37 brought forward and located within reach of an operator standing at the front of the machine, approximately in the position occupied by the notation "Fig. 1" on the drawings. The liner feed-roll 32 is driven at a rate of speed equal to or greater than, the latter preferably, the rate of movement of the rings 29. Any convenient means may be utilized to so drive the liner feed-roll 32, such for instance as the belt 38 encircling the pulleys on the shafts 7 and 39, the latter having fixed thereto the liner feed-roll 32.

The strips of rubber stock are indicated at 40 and 41. These may be conducted over any suitable guiding means to the bight between the grooved rolls 5 and 6. As shown, the strip of stock 40 is led in a plane substantially coincident with that of the rings 29, over the strip-guiding device 42 having a plurality of spaced rolls or pins 43, to a point 44, and thence downwardly to a U-shaped edge-guiding device 45, immediately in advance of the bight between the grooved rolls 5 and 6. The other strip of stock 41, which is applied to the inside of the gang of rings is, as shown, preferably conducted over the set of variously disposed rolls 46 to the roll 47, approximately in the plane of the rings. From the roll 47, the strip of stock 41 is conducted to another U-shaped guiding device 48, and thence to the bight between the grooved rolls 5 and 6. The strips 40 and 41 converge towards the bight between the grooved rolls and allow the rings 29 to freely move to the pressing or working point.

A number 49 in the form of a pin or roll is preferably adjustably supported in a slot 50 provided in a bar 51 secured to the head 4, being located preferably so as to hold the rings steady with their common axis to one side of a perpendicular line passing through the axis of the lower roll 5.

In the operation of the machine, assume the lever 18 pulled down to the position shown in Figure 2. The grooved rolls 5 and 6 being separated, a number of rings—six are shown but there is no limit to the number and ten have been satisfactorily handled in this manner—are introduced and each positioned in one of the grooves 9 in the lower roll 5, and are also preferably rested against the steadying pin 49. The operator then takes the ends of the strips 40 and 41 of stock and inserts them between the gang of rings 29 and the respective rolls 5 and 6. Then, the lever 18 is raised to the position illustrated in Figure 1 of the drawings, with the rolls 5 and 6 in cooperating or working relation. Thereafter, the shaft 7 is coupled up with a source of power and rotated, the rings turning around their common, or substantially common, axis and the stock being progressively applied or stitched down around each of the rings and between them where the two strips of rubber are pressed together and squeezed down to a film of a thickness that offers no substantial resistance to pulling the rings apart when the operation is completed. As the operation progresses, and as occasion requires, the operator presses upon the accessible end 37 of the lever 35 so as to bring the wind-up reel 34 into or out of driving relation with the constantly rotating feed-roll 32. And, in this way, a supply of stock to both sides of the gang of rings is obtained without objectionably tensioning or thinning the strips.

When the annular rings are about covered, the operator cuts off the strips 40 and 41 at the right place to complete the covering, and finishes the application of the rubber to the rings as required. Then, the rolls 5 and 6 are separated by pulling down upon the hand-lever 18, the shoulder 21 being arranged at such an angle as to allow the operator to overcome the spring 24 and throw out the roller 25, the lever 22 then turning in a counter-clockwise direction. The construction and organization of the parts is such that the hand-lever 18 may remain in the depressed position illustrated in Figure 2, with the rolls separated. Then the operator removes the rings and pulls them apart, the thin webs or flanges of rubber between the rings affording little or no resistance to thus parting them. Thereafter, and at a convenient time, the rings are positioned in sectional vulcanizing molds, having opposed semi-circular cavities, and semi-cured. Or, alternatively, the gang of rings may be left webbed together, semi-cured while free, and then separated for incorporation in the margins of the casing. The length of the partial cure will vary with the nature of the stock and the conditions obtaining in the manufacture of the particular casings into which the rings are to be incorporated. For the hard or semi-hard rubber composition, which has been previously referred to, a suitable partial cure may be effected in a 35 minute heat with steam around 40 pounds pressure. After semi-curing the rings, they are removed from the vulcanizing molds and preferably, but not necessarily, sandblasted to roughen their exteriors and afford an improved anchorage for the rubberized plies that are folded about them in the manufacture of casings.

It will be understood that various changes may be made in the method and apparatus which have been above described in detail. The strips of stock might, for instance, be cut to length and applied by hand to the inside and outside of a plurality of the rings previous to the mounting of a gang of rings between the grooved rolls of the machine shown in the drawing or other appliances that might be utilized to press the strips of stock around and together between the wires. In the claims, the term "rings" is used generically to comprehend any type of annular member, whether made up of a single endless wire or a plurality of strands of wire, or whether made out of wire or other material, that it might be desirable to incorporate in tire casings, or any other articles of rubber composition. For an understanding of the scope of the invention reference should be made to the accompanying claims.

Having thus described our invention, what we claim and desire to protect by Letters Patent is:

1. A machine for covering bead rings with rubber composition comprising, in combination, a driven grooved roll, a second and cooperating grooved roll located above the first, the bight between said rolls being accessible from one side thereof for the introduction or removal of rings, means for leading strips of vulcanizable rubber composition between the grooved rolls including two sets of guiding devices, said sets of guiding devices directing the strips convergently to the bight between the grooved rolls, and one of said sets of guiding devices including members deflecting a strip in its travel from contacting with a plurality of rings being covered.

2. A machine for covering bead rings with rubber composition comprising, in combination, a pair of grooved rolls, the bight between said rolls being accessible from one side thereof for the introduction or removal of rings, means for rotating at least one of the rolls, means for approaching or separating at least one of the rolls to bring them into or out of cooperative relation with the work, and means for conducting strips of vulcanizable rubber composition to opposite sides of a plurality of the rings while supported between and rotated by the grooved rolls, said last-named means including strip guiding devices holding one of the strips out of contact with a plurality of rings being covered.

3. A machine for covering bead rings with rubber composition comprising, in combination, a pair of oppositely grooved rolls arranged one above the other, at least one of said rolls being adapted to be driven, the bight between said rolls being accessible from one side thereof for the introduction or removal of rings, means for shifting one of said rolls relative the other, means for guiding strips of rubber composition to the inside and outside of a plurality of rings adapted to be supported by the grooved rolls and rotated in close-lying co-axial relation, and means for supplying the strips of vulcanizable rubber composition at a rate not less than the rate of movement of the rings.

4. A machine for covering bead rings with rubber composition comprising, in combination, a pair of oppositely grooved rolls arranged one above the other, at least one of said rolls being adapted to be driven, the bight between said rolls being accessible from one side thereof for the introduction or removal of rings, means for shifting one of said rolls relative the other, means for guiding strips of rubber composition to the inside and outside of a plurality of rings adapted to be supported and rotated in close-lying co-axial relation, means for supplying the strips of rubber composition at a rate not less than the rate of movement of the rings, said last-named means including a feed-roll driven at a constant rate of speed, and a wind-up reel adapted to be moved to and from a tractive driving relation with the feedroll.

5. A machine for covering bead rings with rubber composition comprising, in combination, a pair of oppositely grooved rolls arranged one above the other, at least one of said rolls being adapted to be driven, the bight between said rolls being accessible from one side thereof for the introduction or removal of rings, means for shifting one of said rolls relative the other, means for guiding strips of rubber composition to the inside and outside of a plurality of rings adapted to be supported and rotated in close-lying co-axial relation, means for supplying the strips of rubber composition at a rate not less than the rate of movement of the rings, said last-named means including a feed-roll driven at a constant rate of speed, a wind-up reel adapted to be moved to and from a tractive driving relation with the feed-roll, and a lever operating said wind-up reel having a manually operable extremity accessible to an operator at the front of the machine.

6. A machine for covering bead rings comprising, in combination, a pair of grooved rolls arranged one above the other, means for rotating the lower roll, the upper roll being adapted to be driven from the lower roll, the bight between said rolls being accessible from one side thereof for the introduction or removal of rings, means for shifting the upper roll including a shaft operatively supporting the upper roll and having its axis eccentric to the axis of the upper roll, and a manually operable lever for turning said shaft at will.

7. A machine for covering bead rings comprising, in combination, a pair of grooved rolls arranged one above the other, means for rotating the lower roll, the upper roll being adapted to be driven from the lower roll, the bight between said rolls being accessible from one side thereof for the introduction or removal of rings, means for shifting the upper roll including a shaft operatively supporting the upper roll and having its axis eccentric to the axis of the upper roll, a manually operable lever for turning said shaft, and means for substantially locking the shaft against turning to hold the upper roll down in a predetermined working relation with the lower roll.

8. A machine for covering bead rings comprising, in combination, a pair of grooved rolls arranged one above the other, means for rotating the lower roll, the upper roll being adapted to be driven from the lower roll, the bight between said rolls being accessible from one side thereof for the introduction or removal of rings, means for shifting the upper roll including a shaft operatively supporting the upper roll and having its axis eccentric to the axis of the upper roll, a manually operable lever for turning said shaft, means for substantially locking the shaft against turning whereby to hold the upper roll down in a predetermined working relation with the lower roll, and stop members for limiting turning movement of the shaft supporting the upper roll to facilitate the location of the upper roll in substantially locked relation with the lower roll.

9. In a machine for covering bead rings with rubber composition, in combination, a pair of grooved rolls, the bight between said rolls being accessible from one side thereof for the introduction or removal of rings, means for rotating one of the rolls, means for relatively approaching or separating the rolls for introducing or removing the work, and a steadying means for locating the rings with their common axis to one side of a vertical line passing through the axis of the driven or rotating roll.

10. In a machine for covering bead rings with rubber composition, in combination, a pair of grooved rolls, the bight between said rolls being accessible from one side thereof for the introduction or removal of rings, means for rotating one of the rolls, means for relatively approaching or separating the rolls for introducing or removing the work, and a steadying member for maintaining the rings in substantially co-axial relation and non-symmetrical of a line passing through the axes of said rolls.

11. In a machine for covering bead rings with rubber composition, in combination, a pair of grooved rolls, the bight between said rolls being accessible from one side thereof for the introduction or removal of rings, means for rotating one of the rolls, means for relatively approaching or separating the rolls for introducing or removing the work, and a steadying member for maintaining the rings in substantially co-axial relation and non-symmetrical of a line passing through the axes of said rolls, said steadying member being adjustably supported.

12. In a machine for covering bead rings with rubber composition, in combination, a pair of grooved rolls, means for supporting said rolls permitting the introduction of rings between them, means for rotating one of the rolls, and means for separating the rolls, the grooves in each roll terminating in blunt faces which are adapted to bear against the corresponding faces of the other roll to pinch rubber interposed between them to a film, the side walls defining said grooves immediately adjacent said contacting faces being flared outwardly whereby an additional amount of rubber composition is enclosed between this portion of the walls of the grooves.

13. A machine for covering bead rings with rubber composition comprising, in combination, a pair of grooved rolls, means for supporting said rolls permitting the introduction of rings between them and including mechanism for shifting the rolls to and from a working relation by movement of at least one of the rolls relative to the other, means for rotating one of the rolls, sources of supply of two strips of rubber composition, and means intermediate the sources of supply and the grooved rolls for guiding the strips to the rolls and directing them to the bight between the rolls from opposite sides of a tangent to their point of contact.

14. A machine for covering bead rings with rubber composition comprising, in combination, a pair of grooved rolls, means for supporting said rolls permitting the introduction of rings between them and including mechanism for shifting the rolls to and from a working relation by movement of at least one of the rolls relative to the other, means for rotating one of the rolls, sources of supply of two strips of rubber composition, and means intermediate the sources of supply and the grooved rolls for guiding the strips to the rolls and directing them to the bight between the rolls from opposite sides of a tangent to their point of contact, said sources of supply being spaced from said grooved rolls and located outside the rings when the latter are being covered, and at least one of the strip guiding devices being arranged to deflect a strip of the rubber composition and direct it inside the rings and to the lower grooved roll.

15. A machine for covering bead rings with rubber composition comprising, in combination, a pair of grooved rolls, means for supporting the rolls permitting rings to be readily introduced therebetween and including mechanism for separating the rolls, means for rotating one of the rolls, a coiled liner supply having strips of rubber composition spaced side by side between its convolutions, means for uncoiling the liner and winding it up at a speed not less than the peripheral velocity of the driven grooved roll, means for guiding the separate strips of rubber composition to the grooved rolls and on the inside and outside faces of a plurality of rings positioned in the grooves, said guiding means being arranged to keep the strips clear of the rings being covered and located so as not to interfere with the introduction and removal of the rings from the bight between the grooved rolls.

Signed at New York city, county of New York, and State of New York, this 18th day of May, 1923.

HECTOR V. LOUGH.

Signed at Detroit, county of Wayne, and State of Michigan, this 23rd day of May, 1923.

GUSTAVE B. MIX.